United States Patent
Kang

(10) Patent No.: US 10,721,092 B2
(45) Date of Patent: Jul. 21, 2020

(54) HIGH-SPEED CAN COMMUNICATION SYSTEM USING PASSBAND MODULATION

(71) Applicant: Suwon Kang, Guri-si (KR)

(72) Inventor: Suwon Kang, Guri-si (KR)

(73) Assignee: VSI CORPORATION, Seoul (KR)

( * ) Notice: Subject to any disclaimer, the term of this patent is extended or adjusted under 35 U.S.C. 154(b) by 872 days.

(21) Appl. No.: 15/026,825

(22) PCT Filed: Oct. 1, 2014

(86) PCT No.: PCT/KR2014/009258
§ 371 (c)(1),
(2) Date: Apr. 1, 2016

(87) PCT Pub. No.: WO2015/050375
PCT Pub. Date: Apr. 9, 2015

(65) Prior Publication Data
US 2016/0241418 A1    Aug. 18, 2016

(30) Foreign Application Priority Data

Oct. 2, 2013    (KR) .................. 10-2013-0117684

(51) Int. Cl.
*H04L 12/40*    (2006.01)
*H04L 12/413*   (2006.01)
*H04L 1/00*     (2006.01)

(52) U.S. Cl.
CPC ...... *H04L 12/40006* (2013.01); *H04L 1/0034* (2013.01); *H04L 1/0061* (2013.01);
(Continued)

(58) Field of Classification Search
CPC ........... H04L 12/40; H04L 2012/40215; H04L 61/12; H04L 2209/84; H04L 67/12; H04B 2203/5416; H04B 2210/074
See application file for complete search history.

(56) References Cited

U.S. PATENT DOCUMENTS 5,881,107 A * 3/1999 Termerinac ......... H04L 27/2082
329/304
7,599,422 B2    10/2009 Stojanovic et al.
(Continued)

FOREIGN PATENT DOCUMENTS

CN    103155493 A    6/2013
CN    103264673 A    8/2013
(Continued)

OTHER PUBLICATIONS

Author Unknown, EtherCAN, retrieved using www.archive.org from http://www.esd-electronics-usa.com/CAN-CANopen-ETHERNET-Gateway-TCP/IP-Modbus/TCP-protocol-EtherCAN.html, as archived on Nov. 25 (Year: 2011).*
(Continued)

*Primary Examiner* — Christopher M Crutchfield
(74) *Attorney, Agent, or Firm* — Paratus Law Group, PLLC

(57) ABSTRACT

Disclosed is a high-speed controller area network (CAN) communication system, which is compatible with a CAN communication system, using passband modulation. The system includes: a high-speed CAN controller configured to provide a standard CAN transmission bit stream and a high-speed CAN transmission bit stream; and a high-speed CAN transmitter configured to synthesize a passband CAN signal obtained by modulating the high-speed CAN transmission bit stream in a passband and a standard CAN signal based on the standard CAN transmission bit stream and to transmit it to a CAN bus.

19 Claims, 18 Drawing Sheets

(52) U.S. Cl.
CPC ......... *H04L 12/40* (2013.01); *H04L 12/4013* (2013.01); *H04L 12/4135* (2013.01); *G05B 2219/25032* (2013.01); *H04L 2012/40215* (2013.01)

(56) References Cited

U.S. PATENT DOCUMENTS

| | | | |
|---|---|---|---|
| 9,170,967 B2* | 10/2015 | Rettig | ............. H04L 12/403 |
| 2004/0054429 A1* | 3/2004 | Doi | .............. G05B 9/02 700/79 |
| 2008/0186870 A1 | 8/2008 | Butts et al. | |
| 2009/0067537 A1 | 3/2009 | Stojanovic et al. | |
| 2012/0099445 A1* | 4/2012 | Matsumoto | ....... H04L 12/40006 370/252 |
| 2012/0269208 A1 | 10/2012 | Gröhlich et al. | |
| 2014/0023089 A1* | 1/2014 | Hartwich | .......... H04L 12/40169 370/468 |

FOREIGN PATENT DOCUMENTS

| | | | | |
|---|---|---|---|---|
| DE | 102012201675 A1 | | 8/2013 | |
| JP | 2008-290538 | * | 12/2008 | ........... B06R 16/023 |
| JP | 2013102306 A | * | 5/2013 | ............. H04L 12/40 |
| WO | WO 2011/006839 A1 | | 1/2011 | |
| WO | WO 2012/038472 A1 | | 3/2012 | |

OTHER PUBLICATIONS

Chinese Office Action for related CN application No. 201480054925.2 dated May 3, 2018 from Chinese Patent Office.
European Search Report for EP Application No. 14 850 505.0 dated May 8, 2017 from European Patent Office.
Liubo Vlacic et al.,; Intelligent Vehicle Technologies; Plant a Tree; 2001; ISBN 0-7506-5093-1, see pp. 23, 27-28.
International Search Report for PCT/KR2014/009258 dated Jan. 21, 2015 from Korean Intellectual Property Office.

* cited by examiner

HIGH-SPEED CAN COMMUNICATION SYSTEM USING PASSBAND MODULATION

CROSS REFERENCE TO PRIOR APPLICATION

This application is a National Stage Patent Application of PCT International Patent Application No. PCT/KR2014/009258 (filed on Oct. 1, 2014) under 35 U.S.C. § 371, which claims priority to Korean Patent Application No. 10-2013-0117684 (filed on Oct. 2, 2013), which are all hereby incorporated by reference in their entirety.

TECHNICAL FIELD

The following description relates to a controller area network (CAN) communication system, and more particularly, to a high-speed CAN communication system in which an existing standard CAN transmission signal is transmitted with a modulated signal in order to obtain higher transmission rate while maintaining compatibility with an existing CAN communication system.

BACKGROUND ART

A controller area network (CAN) communication system is an in-vehicle network system for providing digital serial communication between various measurement and control apparatuses in a car. The CAN system reduces the weight and complexity by replacing complex electric wirings and relays of electric components in the car with efficient serial communication lines. The CAN system was developed using a network protocol for cars in 1980. Its protocol has excellent real-time control performance, is easy-to-implement, and widely used in the manufacturing industry, aviation, railways, and vehicles. CAN is established as a standard ISO 11898 by the International Organization for Standardization (ISO).

A typical structure of a CAN message includes a 1-bit start of frame (SOF) field, a 12-bit arbitration field, a 6-bit control field, a maximum 64-bit data field, a 16-bit cyclic redundancy check (CRC) field, a 2-bit acknowledge (ACK) field, a 7-bit end of frame (EOF) field, and a 3-bit inter frame space as illustrated in FIG. 1. The number of bits in each field is assigned according to the standard. Bits specified by 0 and 1 in a frame of the CAN message of FIG. 1 are transmitted on the CAN bus with a value specified in the standard. The standard allows for using a total 29-bit identifier by adding 18 bits to the 11-bit arbitration field.

The SOF field is transmitted first to indicate the start of the frame. The arbitration field following the SOF field includes either an 11-bit identifier or a 29-bit extended identifier and a remote transmission request (RTR) bit. The identifier field specifies a processing priority of the CAN message frame transmitted when communicating in the CAN. In order for the arbitration field to determine the priority, a unique identifier or identification number is assigned for each message of CAN data generated in each CAN controller. When the RTR bit has a value of "0" (default), it means that the CAN message contains data frame, and when the RTR bit has a value of "1," it means that the CAN message contains remote frame. A remote frame is used when one node on a CAN bus requests data transmission from another node, and does not include a data field.

The control field is configured of 6 bits including 4 bits of data length code (DLC) which indicates the number of bytes of the data field and reserved bits R1 and R2 having a value of "0" to be used later.

The data field includes data to be transmitted from one node to another node with a maximum of 64 bits in length. The CRC field are used for checking cyclic redundancy and is made of 15 bit code and one delimiter bit having a value of "1" which indicates the end. The ACK field is composed of 2 bits. A receiver which has received a valid message correctly reports this to the transmitter by sending a value of "0" during the first slot bit. The second bit has a value of "1."

The EOF field is configured of 7 bits all having values of "1." The 3-bit inter frame space all having values of "1" follows the EOF field. After the 3-bit inter frame space, any node seeking to transmit may use the CAN bus. The node seeking to transmit may attempt to secure the bus by transmitting the SOF field. Following the SOF field, 11-bit or 29-bit identifier is transmitted to the CAN frame. Based upon the identifier, only related receiving nodes are enabled for reception while the other nodes go inactive unless exceptional event such as error occurs.

Two or more nodes may start the transmission simultaneously. In this case, the CAN standard provides multiple access arbitration scheme on the CAN bus. In the CAN standard, a carrier sense multiple access with bitwise arbitration (CSMA/BA) method is used for multiple access. Each of the nodes transmits the identifier after the SOF transmission, and drives the CAN bus with a logic level 0 or 1 according to a value of the identifier. The logic level 0 is referred to as dominant, and the logic level 1 is referred to as recessive. For example, it is assumed that the first node drives the identifier bit with dominant, and the second node drives the identifier bit with recessive. Thus, when two nodes drive the identifier bit with dominant and recessive at the same time, the state of the bus becomes a dominant state. The second node detects that the transmitted bit and the bit received from the bus are different indicting that its message has lower priority and subsequently stops the driving of the bus. As a result, it may be seen that a message having a small value of the identifier (ID) has a higher priority.

The node which obtains right to use the bus through the identifier competition may transmit a maximum of 64 bits during the data field. In order to determine a sampling time during the bit interval, the receiver detects bit transition from the logic level 0 to 1 or from the logic level 1 to 0. In order to ensure that the transition always occurs in a predetermined interval, when the same five or more bits are transmitted, a bit transition of different value is inserted after 5 consecutive same bit transmission. For example, when five bits of "1" are transmitted consecutively, a single bit transmission of "0" is transmitted on the CAN bus after 5 bit transmission and is removed in the receiver. The receiver detects the edge using a change of the bit transmission, and performs the bit detection by sampling after a predetermined offset time. The offset should be set to an appropriate value according to a delay of the system and the like.

Recently, demand for high-speed data transmission, specifically in vehicles including multimedia devices and the like, is increasing. Introduction of an additional high-speed standard transmission method other than the existing CAN interface may be considered. However, new scheme requires additional cable installation increasing vehicle weight and manufacturing costs. Therefore, recently, methods of increasing the data transmission rate based on the CAN standard have been proposed.

First, in order to improve the data transmission efficiency while maintaining the transmission rate of 1 Mbps in the CAN communication system, an efficient scheduling method through a channel delay analysis has been proposed. Additionally, methods for transmitting data at high speeds by overclocking have been proposed. In these methods, the data rate is increased during the overclocking period. However, the period for high data transmission is decreased compared to other standard CAN transmission period. Hence, the overall transmission rate is not increased significantly. In order to perform the high-speed transmission by increasing the data transmission interval by overclocking, a technique related to a CAN with flexible data-rate (CAN-FD) has been proposed. This is a technique in which the overclocking is performed with a maximum of 16 MHz in the data field after acquiring the bus right through the SOF and identifier transmission. After the data field transmission is completed, the rate is returned to an existing CAN rate of 1 Mbps. When CAN-FD devices operate along with the existing CAN devices, existing CAN receivers detect multiple edges in one-bit interval of 1 μs in CAN standard and report errors. Since the compatibility with the existing CAN receivers is not maintained, the CAN-FD scheme should be used between the nodes that support the CAN-FD method.

A method for maintaining the compatibility with the existing CAN receiver during high-speed transmission by overclocking like the CAN-FD method has been proposed. In this method, a high-speed clock is not transmitted over the entire bit interval of 1 μs. Instead, the clock is increased only in a gray zone where the existing CAN nodes do not perform the edge detection in order to maintain compatibility. However, since the data is not transmitted at high speeds over the entire bit interval, the rate is lower than that in the CAN-FD scheme.

All the above-proposed methods increase the rate by overclocking. However, since there is a limit to increasing the clock in the transmission method through the edge detection and the sampling according to the CAN standard and a response of a high-frequency band is limited due to a general frequency characteristic of a channel, it is difficult to ensure reliable reception when using the high-speed clock. In order for the receiver to perform the edge detection and the sampling, the receiver should receive a waveform as close to a rectangular one as possible. When using the high-speed clock, it is difficult for the receiver to completely receive the rectangular waveform, and thus the edge detection and bit detection performance is degraded. Therefore, a maximum rate of the CAN-FD that is being proposed currently is about 16 Mbps.

The present invention is a method in which a passband modulation signal for high-speed data transmission is transmitted in addition to the existing CAN signal that is transmitted in the same way as the CAN standard, and the compatibility with the existing CAN is maintained while enabling high-speed data transmission.

According to the increase of the bandwidth requirement for a vehicle and a controller, multimedia applications that cannot be supported by the existing CAN communication system are on the rise. The installation of a high-speed network in order to address this problem is very expensive. Specifically in the case of a vehicle, the increase in the weight and cost of the vehicle due to installation of additional cables can be prohibitive.

As vehicles become more sophisticated, electronic control apparatuses and multimedia apparatuses increase, and a huge amount of cabling is required to connect these separate apparatuses with each other. The cables take a significant part of the overall vehicle weight and manufacturing costs, posing issues in the reliability and component quality management. Hence, fundamental countermeasures are necessary to meet the challenges.

FIG. 2 illustrates a CAN communication system used in a conventional vehicle and the like. Each node on the CAN communication system includes a CAN controller, and the CAN controller may perform transmitting and receiving of a standard CAN bit stream, and serves to generate a standard CAN frame, process an identifier, transmit data, and perform error processing, and the CAN transceiver serves to load actual bits with dominant and recessive bits onto a CAN bus. In general, a differential signal is used for robustness to errors. When the recessive bit is transmitted, in general, the corresponding node does not drive the bus, and thus a state of the bus is set to return to a default value. When another node drives the bus in this state, the state of the bus changes to the one that the driving node specifies.

FIG. 3 illustrates a bus driving signal of the CAN transceiver illustrated in FIG. 2. The dominant signal corresponds to a bit 0, and the recessive signal corresponds to a bit 1. When the dominant signal is transmitted, the corresponding node transmits the signal to the bus, and when the recessive signal is transmitted, the corresponding node does not load the signal onto the bus. When the CAN nodes simultaneously drive the dominant and the recessive in the same bit interval, the state of the CAN bus becomes a dominant state. During the arbitration period, the node that transmits the dominant bit acquires the right to transmit the data on the bus, and the node that transmits the recessive bit waits until the bus is available later.

DISCLOSURE

Technical Problem

The present invention is directed to providing a high-speed controller area network (CAN) communication system in which an existing CAN transmission bit is transmitted in the standard CAN signal and high speed data bits are transmitted in a passband CAN signal obtained by modulating the data in a passband that is synthesized with the standard CAN signal, the synthesized signal is delivered to a CAN bus, and data transmission rate is increased while maintaining the compatibility with an existing CAN communication system in order to address the above-described problems.

Technical Solution

One aspect of the present invention provides a high-speed controller area network (CAN) communication system compatible with the existing CAN communication system. The high-speed CAN communication system using passband modulation includes a CAN controller which provides a standard CAN transmission bit stream and a high-speed CAN transmission bit stream and a CAN transmitter which synthesizes a passband CAN signal obtained by modulating the high-speed CAN transmission bit in a passband and a standard CAN signal to deliver them to a CAN bus.

Meanwhile, a high-speed CAN receiver on the bus receives the synthesized high-speed CAN signal and demodulates the passband signal among them, supporting high data rate.

Advantageous Effects

The technique to be described below significantly improves data transmission rate compared to the existing controller area network (CAN) system while it does not cause significant cost increase due to its compatibility with the existing CAN system, resulting in contribution to weight saving and data rate increase of target CAN system.

In the existing CAN standard, when the receiver receives a frame incompatible with the CAN standard, the receiver can transmit an error frame to stop the transmission. In the technique to be described below, the high-speed CAN communication system using passband modulation transmits a passband signal to only a dominant bit interval with limited amplitude. Accordingly, conventional CAN receivers located on the same bus receive the combined high-speed CAN signal as the standard CAN signal without generating frame error. Meanwhile, the high-speed CAN receiver that supports the high-speed CAN communication system recognizes and receives the passband signal in the high-speed CAN signal, and thus it is possible to receive data at a high speed. As a result, in the technique to be described below, the compatibility with the existing CAN standard is maintained.

Since the proposed high-speed CAN communication system is compatible with existing CAN communication apparatuses which are installed and in operation, applications that require high data rate such as multimedia can be gradually added thereto while maintaining compatibility with the existing CAN system in operation, and thus manufacturers such as car manufacturers can easily introduce and use them.

DESCRIPTION OF DRAWINGS

FIG. 2 is a diagram schematically illustrating a conventional CAN communication system used in a vehicle and the like.

MODES OF THE INVENTION

Hereinafter, exemplary embodiments of the present invention will be described in detail with reference to the accompanying drawings. In the accompanying drawings, only main components are illustrated in larger sizes for clarity of the present invention and additional components are omitted, and thus the drawings should not be interpreted as limiting.

Figure 4:
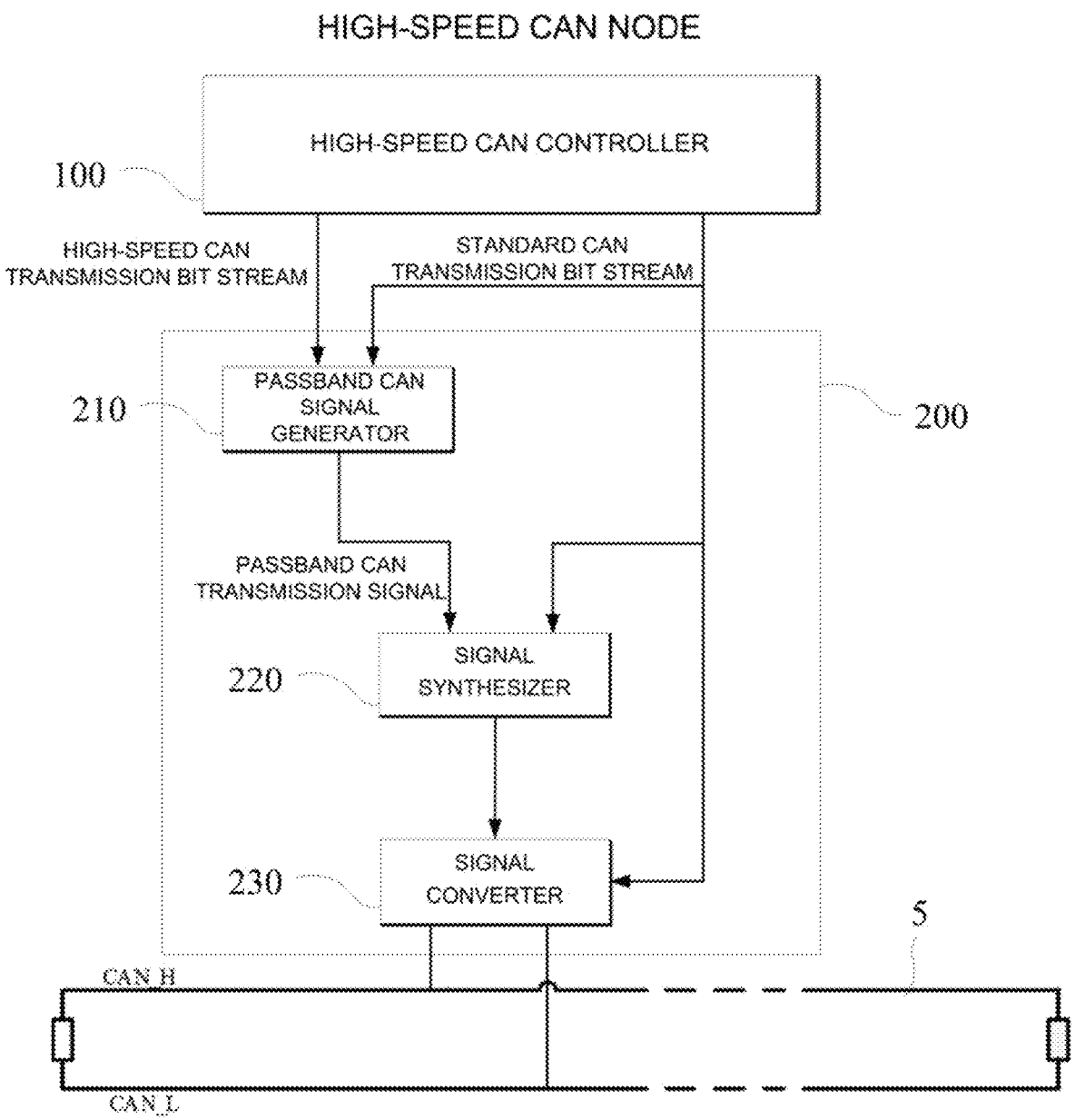
FIG. 4 is a diagram illustrating a configuration of a high-speed CAN transmission system according to the present invention.

FIG. 4 illustrates a high-speed controller area network (CAN) communication system according to the present invention, and the high-speed CAN communication system includes a high-speed CAN controller 100 and a high-speed CAN transmitter 200. The high-speed CAN controller 100 transmits a high-speed CAN transmission bit stream according to the present invention as well as a standard CAN transmission bit stream which is an existing CAN message frame to the high-speed CAN transmitter 200.

The standard CAN transmission bit stream refers to data transmitted based on the CAN standard, and the high-speed CAN communication bit stream refers to data transmitted from the high-speed CAN communication system using passband modulation. The standard CAN transmission bit stream includes a start of frame (SOF) field, an arbitration field, a control field, a data field, a cyclic redundancy check (CRC) field, an acknowledge (ACK) field, an end of frame (EOF) field and an inter frame space field which are defined in the CAN standard.

Data transmitted at a high speed in passband may be a message frame based on any protocol. Further, it is also possible to use an interleaver and an error correction code for the reliable transmission and reception. Various formats may be used for the data transmitted using the high-speed CAN communication system transmitted in passband.

The standard CAN transmission bit stream is input to a passband CAN signal generator 210, a signal synthesizer 220, and a signal converter 230.

The high-speed CAN transmitter 200 includes the passband CAN signal generator 210, the signal synthesizer 220, and the signal converter 230.

The passband CAN signal generator 210 receives the high-speed CAN transmission bit stream to convert to a passband CAN signal. Since the standard CAN transmission bit is transmitted through a CAN bus 5 only when the standard CAN transmission bit is a dominant bit, that is, a bit 0, the passband CAN signal generator 210 is enabled to receive the high-speed CAN transmission bit only when the CAN transmission bit is a dominant bit.

Figure 5:
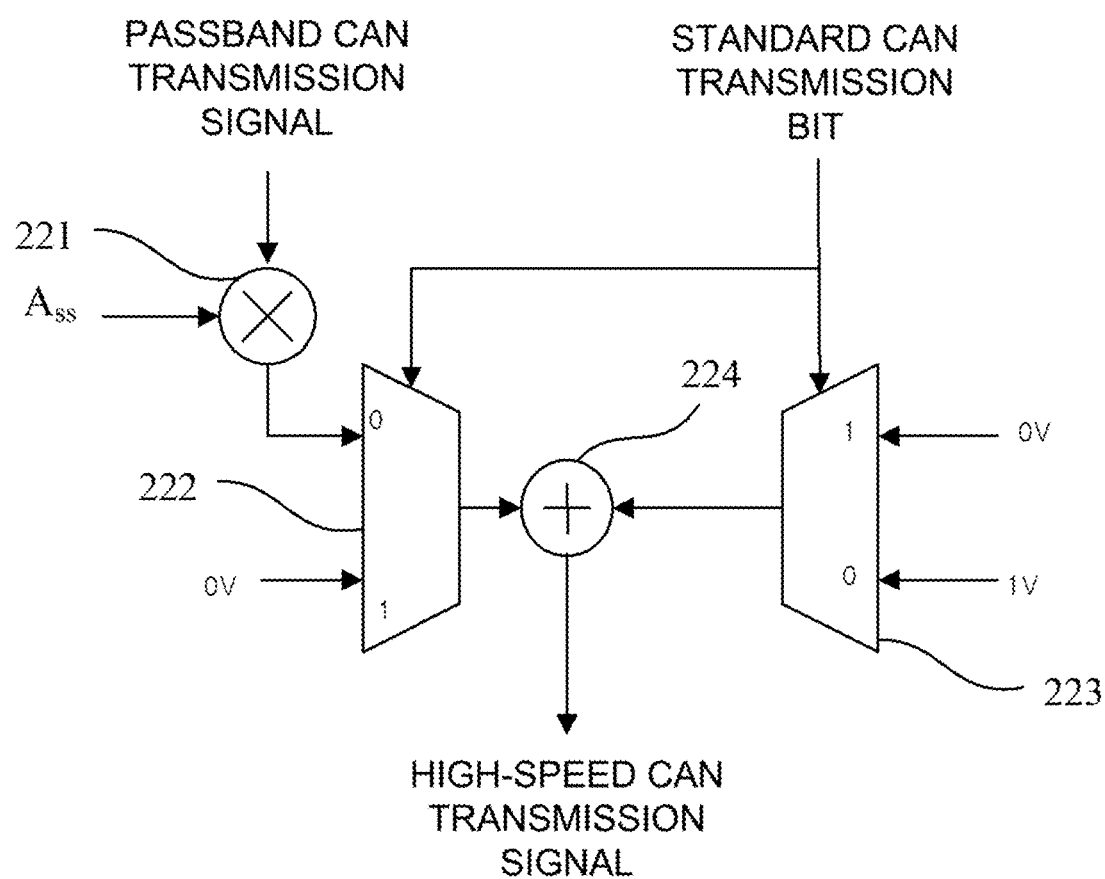
FIG. 5 illustrates the signal synthesizer illustrated in FIG. 4.

In the signal synthesizer 220 of FIG. 5, a passband CAN transmission signal is input to the first signal selector 222 after being multiplied by a weight $A_{SS}$ in a multiplier 221. The first signal selector 222 receives the standard CAN transmission bit stream as a control input, and outputs input port 0 when the control bit of the received bit stream is 0 and outputs input port 1 when the control bit of the received bit stream is 1. The standard CAN transmission bit stream is delivered as a control input of the second signal selector 223, and outputs 1 V of the input port 0 when the control bit is 0 and outputs 0 V of the input port 1 when the control bit is 1. The output of the second signal selector 223 constitutes the existing standard CAN transmission signal. The standard CAN transmission signal is based on the standard CAN transmission bit stream delivered from the high-speed CAN controller 100.

The outputs of the first signal selector 222 and the second signal selector 223 are combined in an adder 224, and an output of the adder 224 constitutes the high-speed CAN transmission signal.

The signal converter 230 drives the bus only when the standard CAN transmission bit stream is in a dominant bit interval, and converts a single-ended signal to a differential signal to be delivered to the CAN bus 5. The signal converter 230 stops the driving of the CAN bus 5 when the standard CAN transmission bit stream is in a recessive bit interval.

Figure 6:
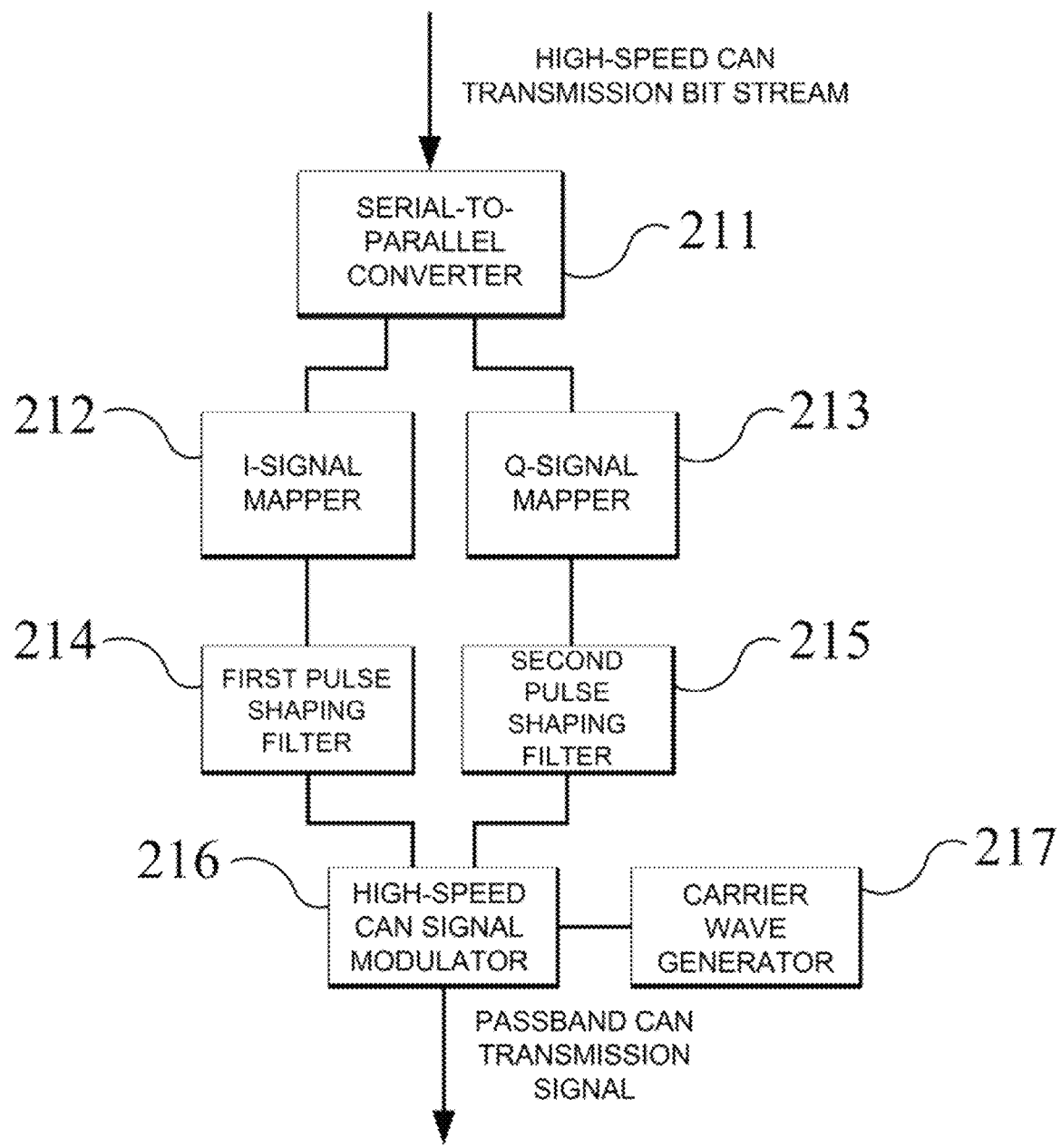
FIG. 6 illustrates the passband CAN signal generator illustrated in FIG. 4.

FIG. 6 illustrates the passband CAN signal generator 210 illustrated in FIG. 4, and the passband CAN signal generator 210 includes a serial-to-parallel converter 211, an I-signal mapper 212, a Q-signal mapper 213, the first pulse shaping filter 214, the second pulse shaping filter 215, a high-speed CAN signal modulator 216, and a carrier wave generator 217.

The high-speed CAN bit stream which is an input of the signal generator is input with a rate R (R>1 Mbps) higher than a rate of 1 Mbps of the standard CAN bit stream. The serial-to-parallel converter converts the high-speed CAN bit stream to two streams for passband transmission, the first stream is applied to In-phase (I) signal mapping, and the second stream is applied to Quadrature (Q) signal mapping. One or more bits may be loaded to an I-signal and a Q-signal according to a passband modulation method. For example, one bit may be loaded to each of the I-signal and the Q-signal when using a QPSK modulation method and two bits may be loaded to each of the I-signal and the Q-signal when using 16QAM. The symbol rate, $f_s$, of each of the I-signal and the Q-signal becomes R/2 when using the QPSK, and becomes R/4 when using the 16QAM signal.

Since transmitting an integer number of passband symbols in 1-bit intervals of the standard CAN signal helps simplify the transmission system, it is advantageous for $f_s$ to set to $n_1$ MHz (where, $n_1$ is an integer of two or more). When using the QPSK, the bit 0 is mapped to 1, and the bit 1 is mapped to −1. When using the 16QAM, the bit 00 is mapped to −1, the bit 01 is mapped to −⅓, the bit 10 is mapped to ⅓, and the bit 11 is mapped to 1.

The pulse shaping filter is used to limit the out-of-band radiation of the passband signal, and a root raised cosine (RRC) filter or various pulse shaping filters may be used according to a frequency characteristic of the bus and the passband CAN standard modulation method. The mapped signal, which passes through the filer, is converted to $S_I(t)$ and $S_Q(t)$ which are band-limited signals. According to the CAN standard, since all nodes on the CAN bus 5 may drive the bus only when transmitting the dominant signal, the passband CAN signal is generated and transmitted only in the dominant bit transmission interval of the standard CAN signal.

The carrier wave generator 217 generates a carrier wave signal for a passband frequency $f_c$ of the passband CAN signal. As the passband frequency $f_c$ is increased, the separation between the standard CAN signal and passband signal in frequency domain is increased, reducing mutual interference. However, too high $f_c$ may cause the signal to be severely attenuated due to high frequency attenuation effect of the channel. Therefore, the passband frequency $f_c$ needs to be set to an appropriate value according to system requirements.

The modulator 216 performs the modulation as in Equation 1. φ represents a phase of the carrier wave. While $f_c$ may be set to any value as an operation frequency of the carrier wave, it is advantageous for $f_c$ to be set to $n_2$ MHz (where, $n_2$ is an integer of two or more) in order to simplify the system. In this case, the carrier wave of the $n_2$ cycle fits into one standard CAN bit interval. For convenience of description, it is assumed that $S_{SS}(t)$ is normalized so that a maximum value is 1 V and a minimum value is −1 V.

$$s_{SS}(t)=s_I(t)*\cos(2\pi f_c t+\varphi)+s_q(t)\sin(2\pi f_c t+\varphi) \quad \text{[Equation 1]}$$

The standard CAN signal in FIG. 5 has a value of 1 V when the standard CAN transmission bit is 0 (dominant), and has a value of 0 V when the standard CAN transmission bit is 1. When it is assumed that the 1-bit interval of the standard CAN signal is $T_{CAN}$ and the standard CAN bit is $b_k$ in $(k-1)T_{CAN} < t < kT_{CAN}$ interval, the standard CAN signal $S_{CAN}(t)$ is expressed as Equation 2.

$$s_{CAN}(t)=\begin{cases} 0, & b_k=1 \\ 1, & b_k=0 \end{cases}, (k-1)T_{CAN} < t < kT_{CAN} \quad \text{[Equation 2]}$$

The signal synthesizer 220 may combine the passband CAN signal multiplied by the weight and the standard CAN signal, expressed as the following Equation 3.

$$\hat{s}_{SS}(t)=s_{CAN}(t)+A_{SS}s_{SS}(t) \quad \text{[Equation 3]}$$

$A_{SS}$ represents the weight of the passband CAN signal, and in this case, it may be seen that the passband CAN signal has a maximum value of $A_{SS}$ V and a minimum value of $-A_{SS}$ V. The high-speed CAN signal $\hat{S}_{SS}(t)$ which is the sum of the standard CAN signal and the passband CAN signal has the minimum value of $1-A_{SS}$ V in an interval in which the passband signal is transmitted. Therefore, an appropriate $A_{SS}$ which satisfies a condition of $1-A_{SS}>0.5$ V should be selected so that the existing CAN nodes on the bus do not erroneously detect the signal as the recessive bit.

Figure 7:
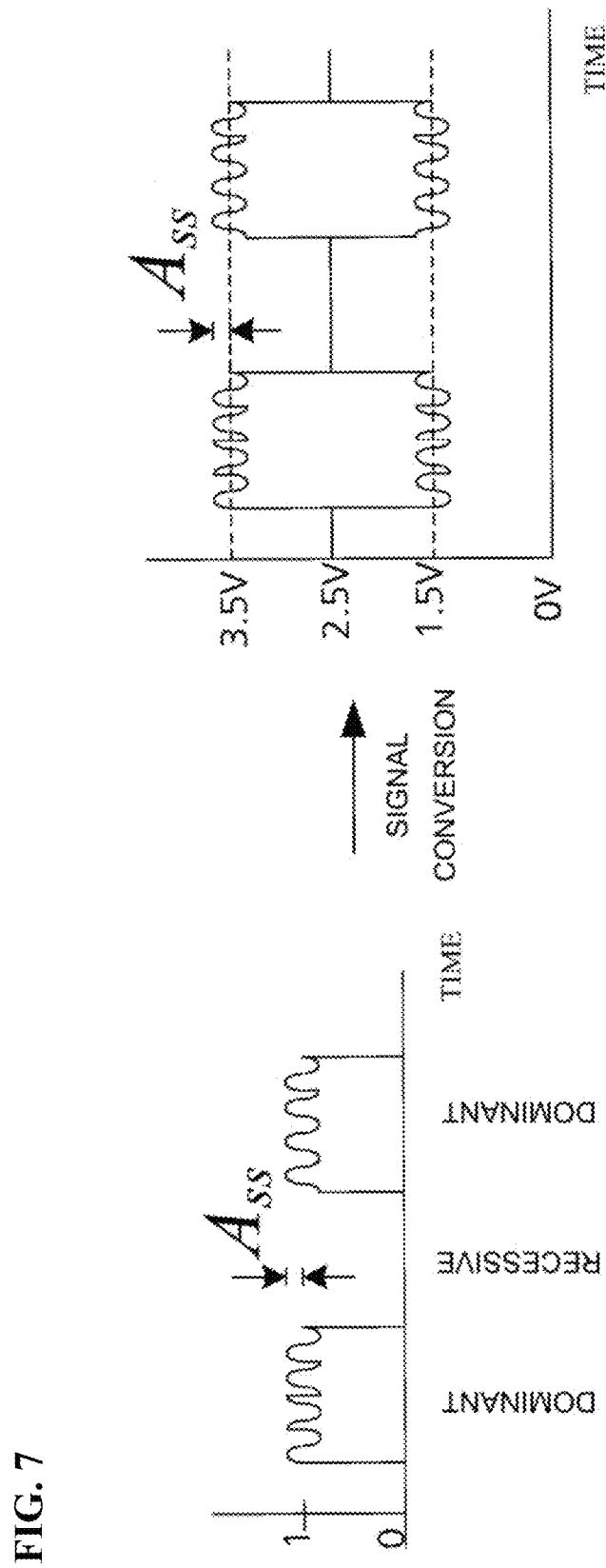
FIG. 7 is a graph illustrating a differential signal waveform converted by a signal converter.

The signal converter 230 converts the single-ended signal to the differential signal to load it onto the bus as illustrated in FIG. 7. FIG. 7 illustrates an example of the case of using the QPSK modulation as the passband modulation method.

In general, an amplitude of the CAN standard signal is 1 V based on the single-ended signal and is 2 V based on the differential signal. The passband CAN signal of the present invention is built such that the amplitude of $A_{SS}S_{SS}(t)$ has a value in a range of tens of mV to hundreds of mV which is smaller than the CAN standard signal level of 1V. Accordingly, when the existing CAN nodes of the CAN bus 5 receive the passband CAN modulation signal during the dominant bit transmission interval, the level of the received signal does not become so small to cause erroneous detection. Since the transmitter drives the bus only when the CAN signal is in the dominant bit interval according to the CAN standard, the passband CAN signal is not loaded when the CAN signal is in the recessive bit interval. The signal synthesizer 220 synthesizes the passband CAN signal only in the dominant bit interval of the standard CAN bit stream for the compatibility with the CAN standard nodes, and does not synthesize the passband CAN signal in the recessive bit interval.

Figure 8:
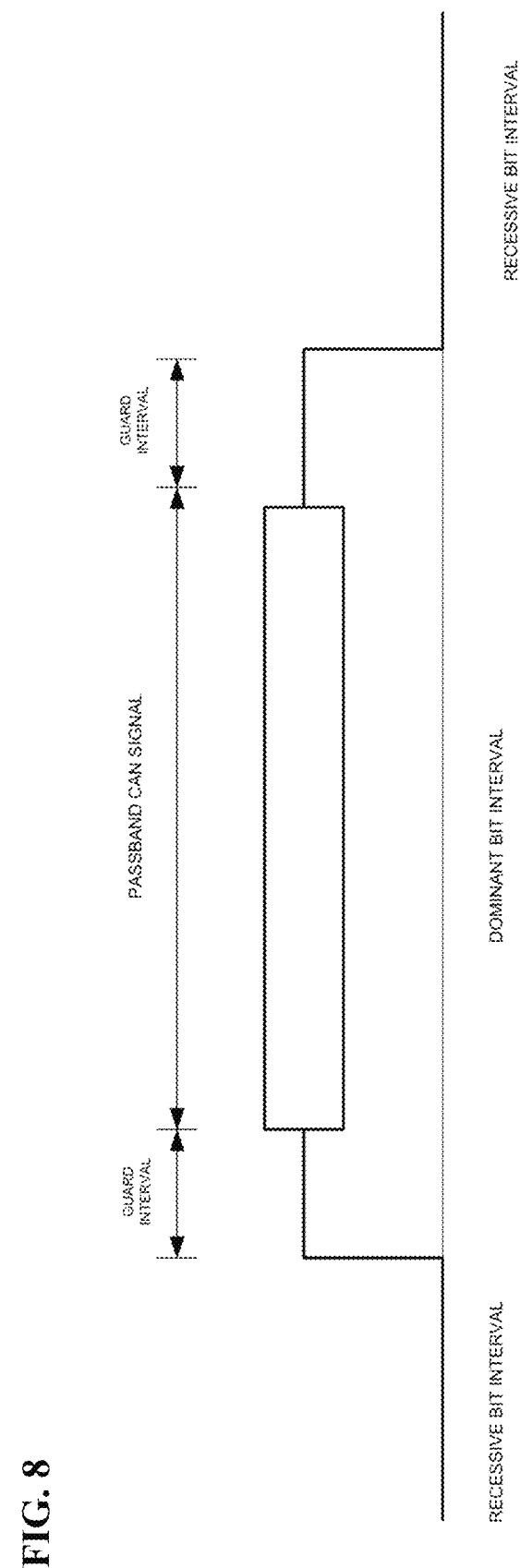
FIG. 8 is a graph illustrating a passband CAN signal when a passband signal is not transmitted during a guard interval.
Figure 9:
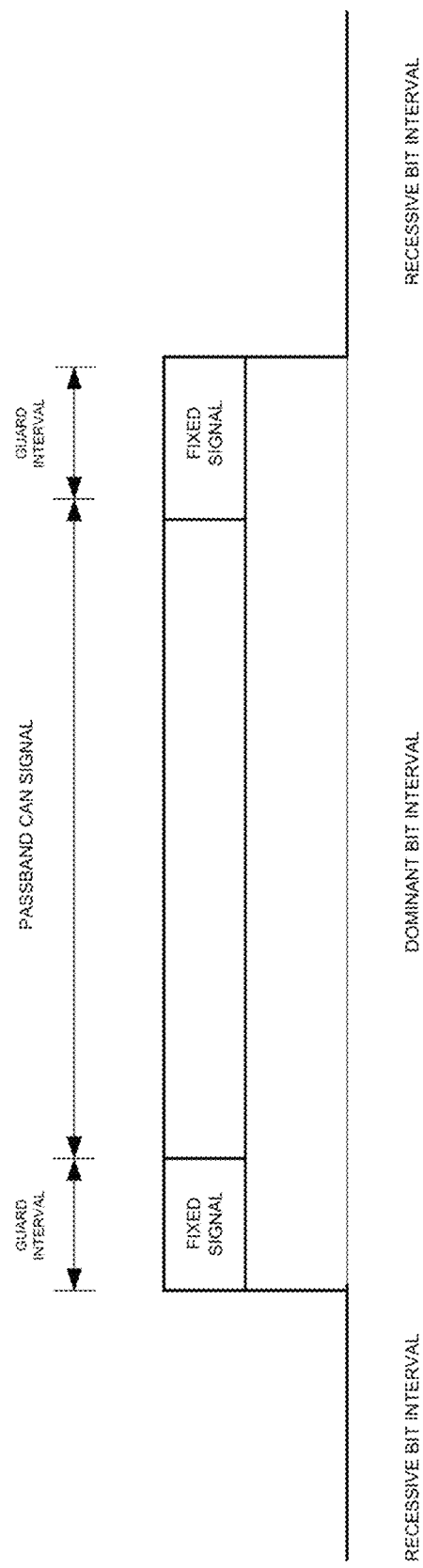
FIG. 9 is a graph illustrating a passband CAN signal when a fixed signal is transmitted during a guard interval.
Figure 10:
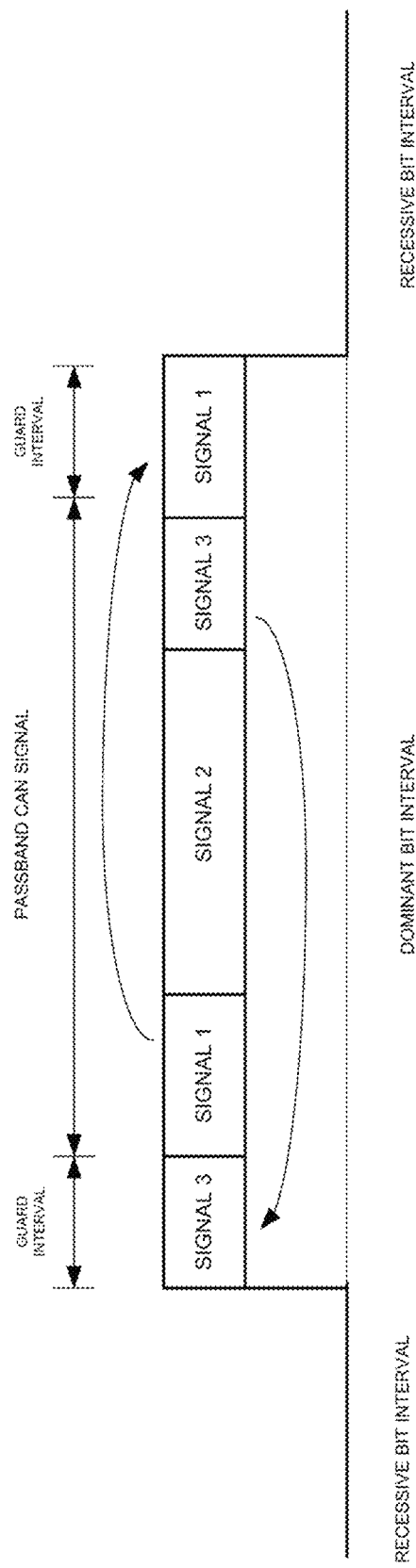
FIG. 10 is a graph illustrating a passband CAN signal when part of the passband CAN signal is repeated during a guard interval.

The high-speed CAN transmitter 200 may use a guard interval at the start portion and end portion of a consecutive transmission interval of the passband CAN signal. During the guard interval, the passband CAN signal may not be transmitted as in the example of FIG. 8, or contain fixed signal as in the example of FIG. 9, or repeat part of the passband CAN signal as in the example of FIG. 10. The guard interval protects the passband CAN signal from interference caused by the abrupt transmission changes of the dominant bits and recessive bits at the start and end of consecutive transmission interval. The length of the guard interval may be changed according to the delay characteristic of the channel. FIG. 8 illustrates the case in which the passband CAN signal is not transmitted during the guard interval. FIG. 9 illustrates the case in which the fixed signal is transmitted during the guard interval. FIG. 10 illustrates the case in which, when the passband CAN signal includes a signal 1, a signal 2, and a signal 3, the signal 3 is repeated at the start portion and the signal 1 is repeated at the end portion. The guard interval may be present at both of the start portion and the end portion, or may be present at any one portion thereof.

Figure 11:
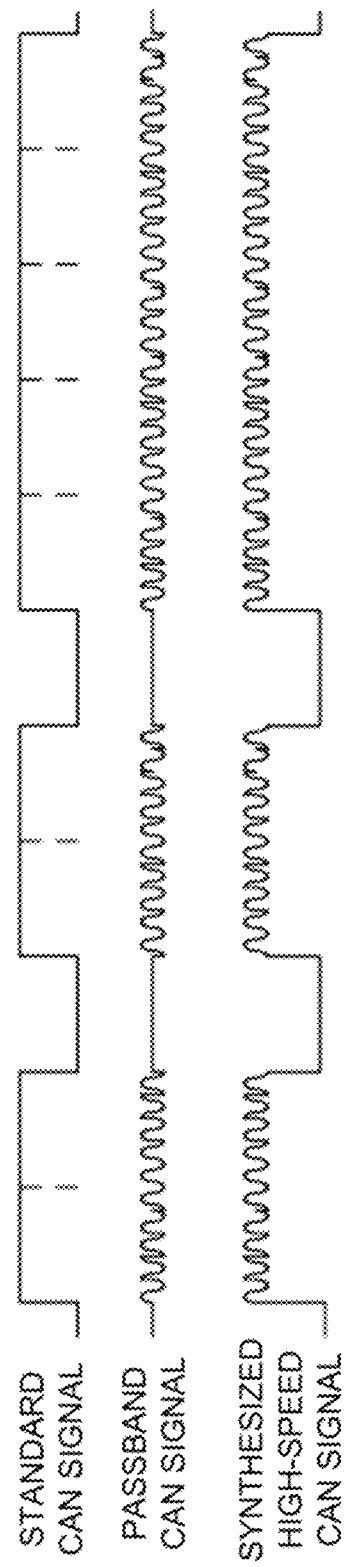
FIG. 11 is a graph illustrating standard CAN signal, passband CAN signal, and transmission signal waveforms.

FIG. 11 illustrates a method of building a high-speed CAN signal generated by combining a standard CAN signal and a passband CAN signal. A fixed amplitude modulation method and a variable amplitude modulation method may be used as methods of modulating the passband CAN signal. However, the high-speed CAN signal generated by combining the passband CAN signal and the standard CAN signal should be restricted by adjusting the amplitude of the passband CAN signal so that the existing CAN nodes are protected against false detection of bits and edges in interval of 1 μs.

Figure 12:
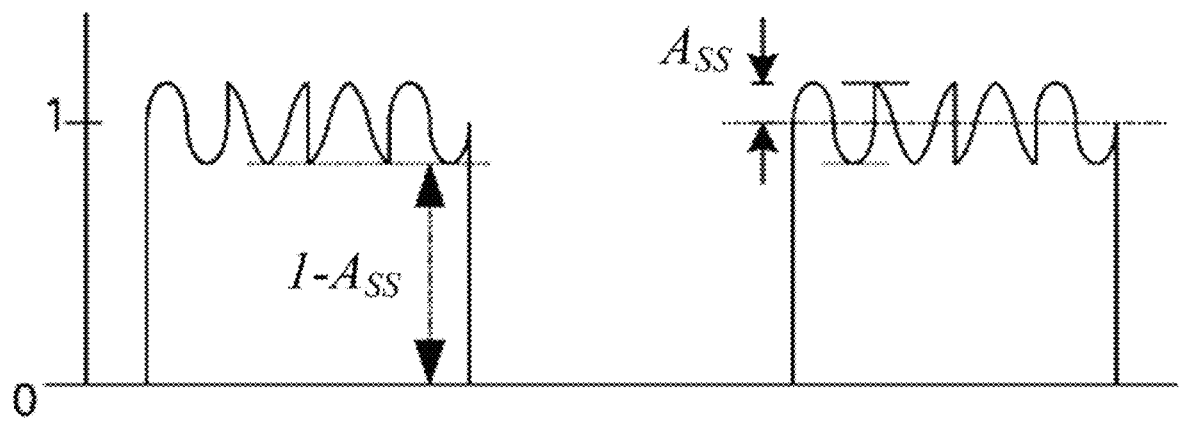
FIG. 12 is a waveform illustrating a high-speed CAN signal.

A minimum level $S_{min}$ during the dominant bit transmission is equal to $1-A_{SS}$ V based on the single-ended signal as illustrated in FIG. 12. As the $A_{SS}$ is reduced, the difference between the minimum value $S_{min}$ and 0 V is increased. Therefore, the possibility of erroneous detection of the dominant bit as the recessive bit at the existing CAN node receiver is reduced. On the other hand, when the weight $A_{SS}$ of the passband CAN signal is increased, while there is an advantage of the increase of a signal-to-noise ratio of the passband CAN signal, the minimum value $S_{min}$ is reduced, and thus the possibility of erroneous detection of the bit and edge by the existing CAN nodes which receive the high-speed CAN signal is increased.

The weight $A_{SS}$ of the passband CAN signal is a system parameter to be adjusted according to the modulation method, the channel characteristic, and the transmission rate of the passband CAN signal generator. The weight $A_{SS}$ may be set differently for each fields in the standard CAN frame and each data group within data field. For example, the $A_{SS}$ can be set to be small such that the signal is transmitted with small amplitude in the SOF field and arbitration field intervals in order to facilitate the interoperability with the existing CAN nodes, and the $A_{SS}$ may be set to be large in the other intervals including the data field.

Figure 13:
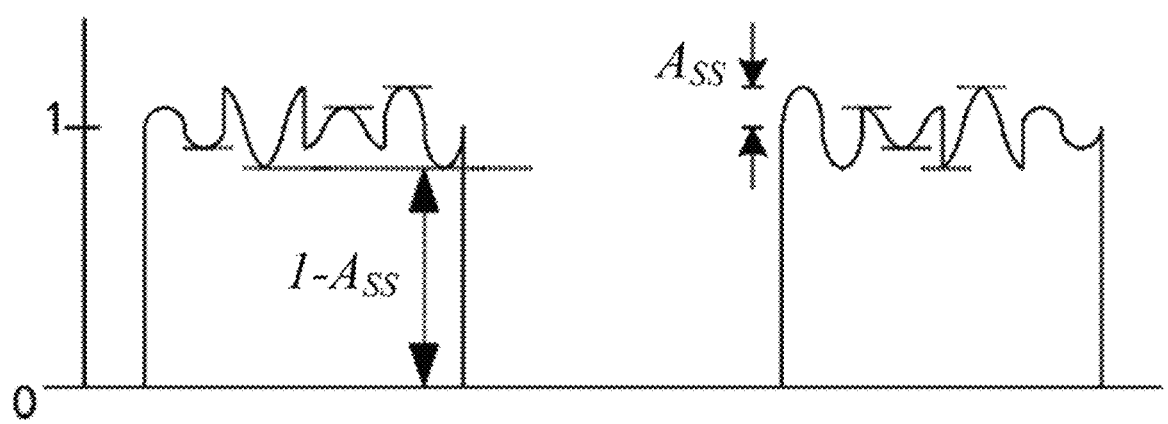
FIG. 13 is a waveform illustrating a high-speed CAN signal when using a variable amplitude modulation method.

The variable amplitude modulation method used by the passband CAN signal generator 210 has an advantage of high-speed data transmission by increasing the spectral efficiency. Modulation schemes such as 16QAM, 32QAM and 64QAM may be used according to the characteristic of the channel. The passband CAN signal transmitted using the variable amplitude modulation method has various amplitude vertex values according to the transmission bit stream as illustrated in FIG. 13. The passband CAN signal generator 210 may find the lowest value of all the vertex values of the passband CAN signal, and limit the weight $A_{SS}$ based on the lowest value in order to ensure the compatibility with the existing CAN transmission apparatus.

Both frequency modulation and phase modulation may be used as the fixed amplitude modulation method used by the passband CAN signal generator 210. BPSK, QPSK, OQPSK, or π/4-DQPSK method may be used as the phase modulation method. FSK, CPM, or the like may be used as the frequency modulation method.

Figure 14:
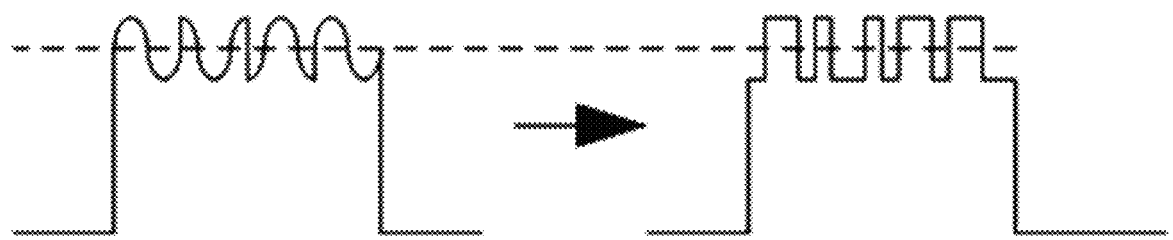
FIG. 14 is a diagram for describing a method of clipping a passband signal.
Figure 15:
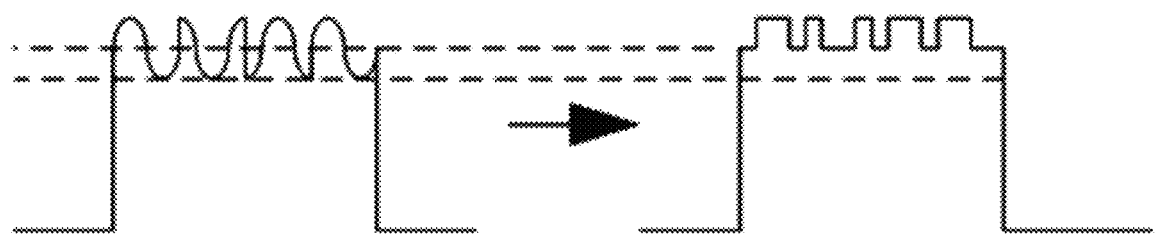
FIG. 15 is a diagram for describing a method of clipping a passband signal.

When the passband CAN signal generator 210 uses the fixed amplitude modulation method, information is not carried in the amplitude of the passband signal. Therefore, it is possible to transmit the passband signal by limiting (clipping) as illustrated in FIGS. 14 and 15. In this case, the complexity of the signal synthesizer 220 and the signal converter 230 may be reduced. The clipping of the passband signal uses the outputs of the pulse shaping filters 214 and 215. When there is no pulse shaping filter for the passband CAN signal, the outputs of the signal mappers 212 and 213 are clipped as illustrated in FIG. 14 or 15. In FIG. 14, when the passband CAN signal is greater than 0, the passband CAN signal is simplified to 1, and when the passband CAN signal is smaller than 0, the passband CAN signal is simplified to −1, and thus the passband CAN signal generator 210, the signal synthesizer 220, and the signal converter 230 may be easily implemented. The clipping method of FIG. 14 can be further simplified as in FIG. 15 when the passband signal is fixed to 1 for the passband signal greater than 0, and the passband signal is fixed to 0 for the passband signal smaller than 0. In this case, the output of the passband CAN signal generator 210 has one of the two values 1 and 0 without any negative value. Therefore, the passband CAN signal generator 210 may be further simplified from FIG. 5, and the signal synthesizer 220 and the signal converter 230 may be further simplified.

Figure 16:
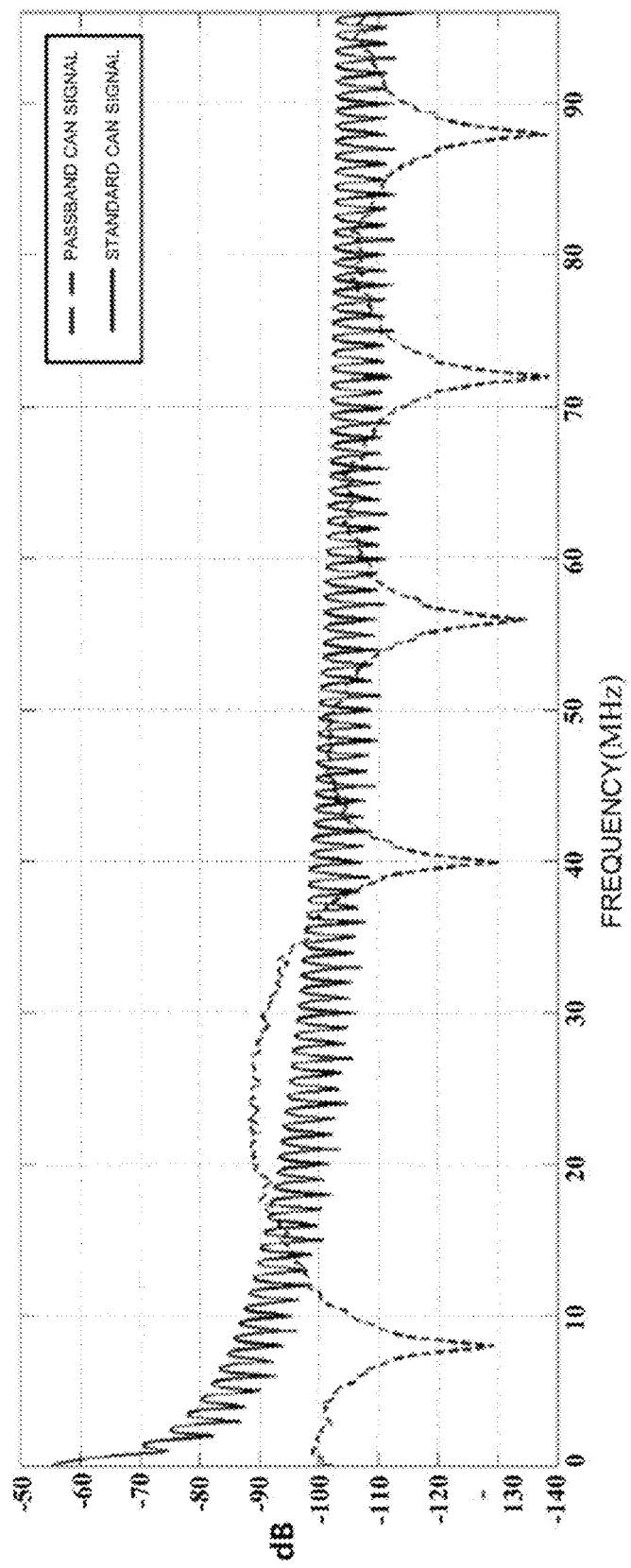
FIG. 16 illustrates frequency spectra of a passband CAN signal and a standard CAN signal.

FIG. 16 illustrates an example of frequency spectrum of the high-speed CAN signal of the proposed method. An RRC (root raised cosine) filter with a roll-off factor of 0.3 is used as a pulse shaping filter of the passband CAN signal. The passband CAN signal has a carrier frequency $f_c$ of 24 MHz, a symbol ratio $f_s$ of 16 MHz, and an amplitude $A_{SS}$ of 100 mV, and uses a QPSK method as a modulation method. The radiation characteristic of the passband CAN signal in frequency domain may be adjusted by using appropriate the pulse shaping filter depending upon the radiation condition and the modulation method.

The passband transmission signal may be variously configured according to the modulation method, carrier frequency, and symbol rate. Table 1 illustrates some examples of the passband CAN transmission system.

TABLE 1

| | Modulation method | Carrier frequency | Symbol rate | Maximum transmission rate of passband CAN signal |
|---|---|---|---|---|
| Implementation example 1 | QPSK | 8 MHz | 4 MHz | 8 Mbps |
| Implementation example 2 | QPSK | 32 MHz | 32 MHz | 64 Mbps |
| Implementation example 3 | QPSK | 64 MHz | 64 MHz | 128 Mbps |
| Implementation example 4 | 16QAM | 64 MHz | 64 MHz | 256 Mbps |

Figure 1:
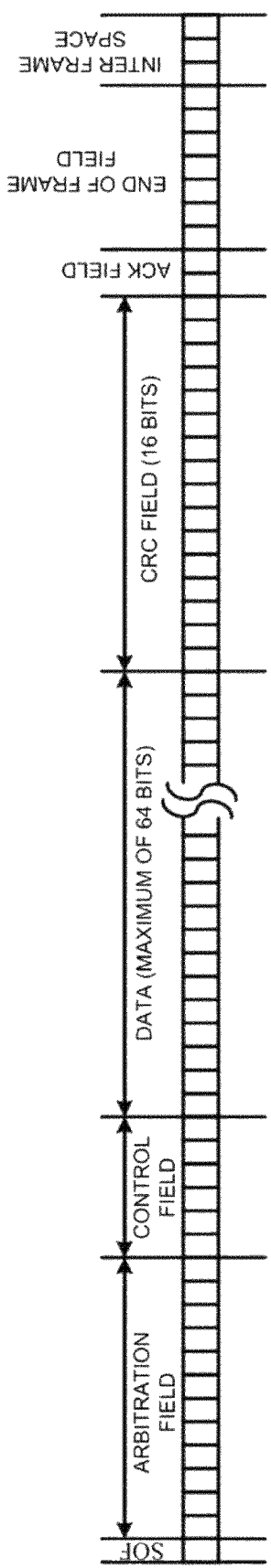
FIG. 1 illustrates a standard controller area network (CAN) message frame.
Figure 2:
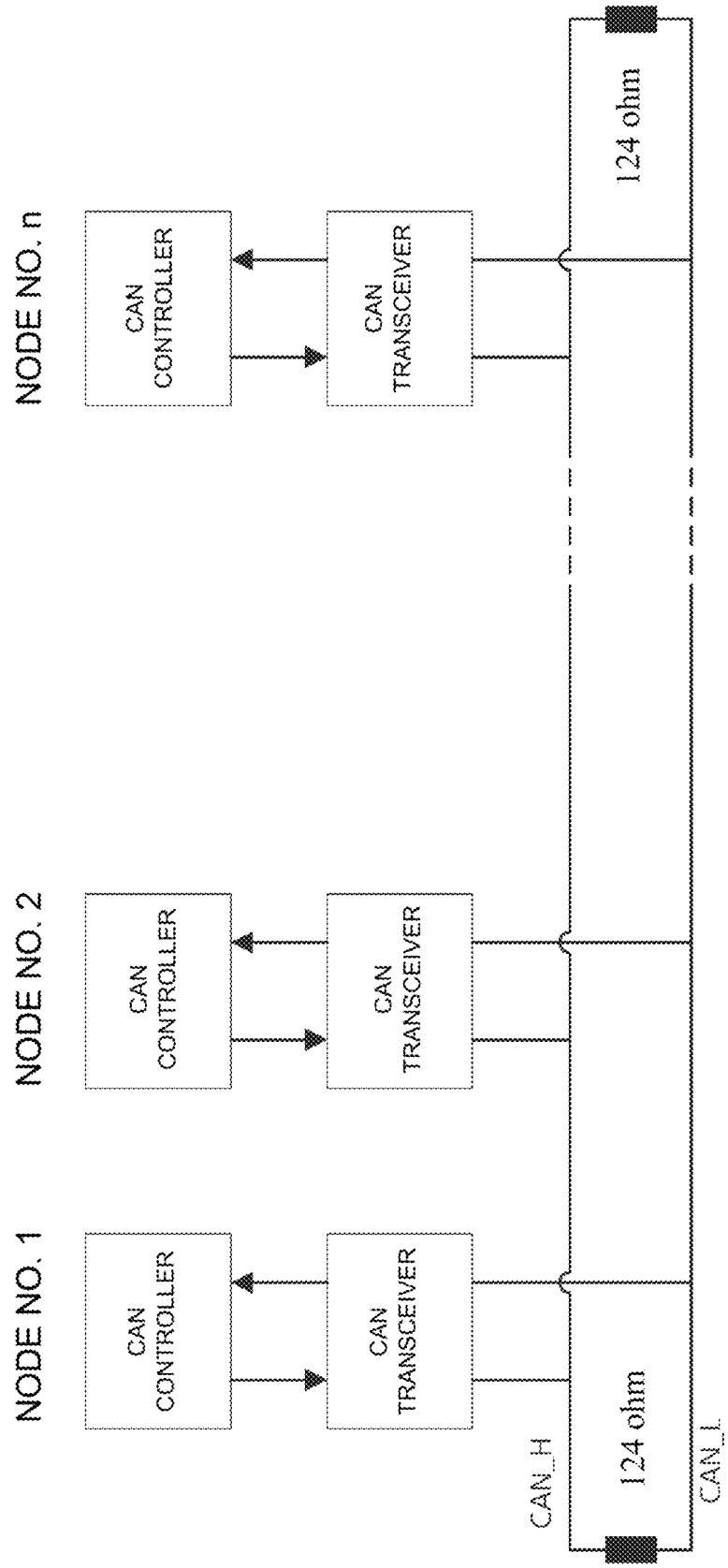
Figure 3:
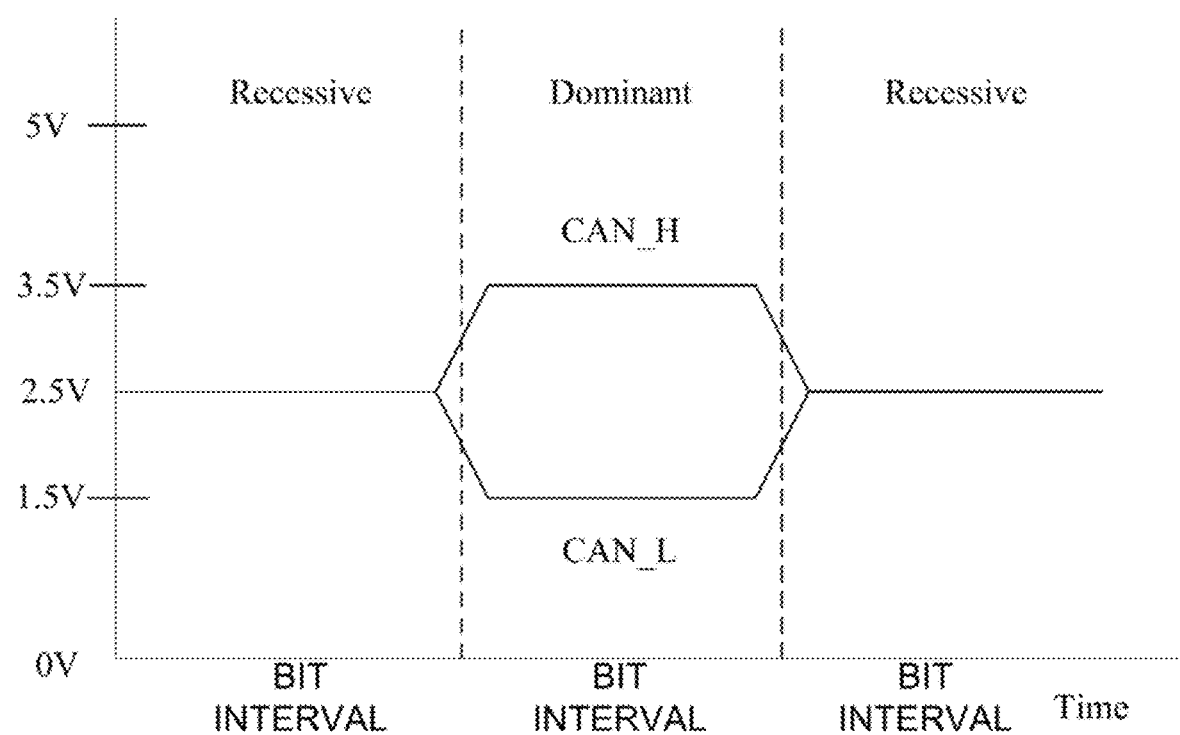
FIG. 3 is a graph illustrating a bus signal characteristic of a CAN signal.

It is possible to transmit the passband CAN signal during the entire CAN frame as long as the node is allowed to drive the CAN bus 5. For example, the passband CAN modulation signal can be transmitted in the SOF field, the arbitration field, the control field, the data field, and the CRC field in the CAN message frame structure of FIG. 1 when dominant bits are transmitted. However, the passband CAN signal is not transmitted to the ACK field, the EOF field and the inter frame space.

Figure 17:
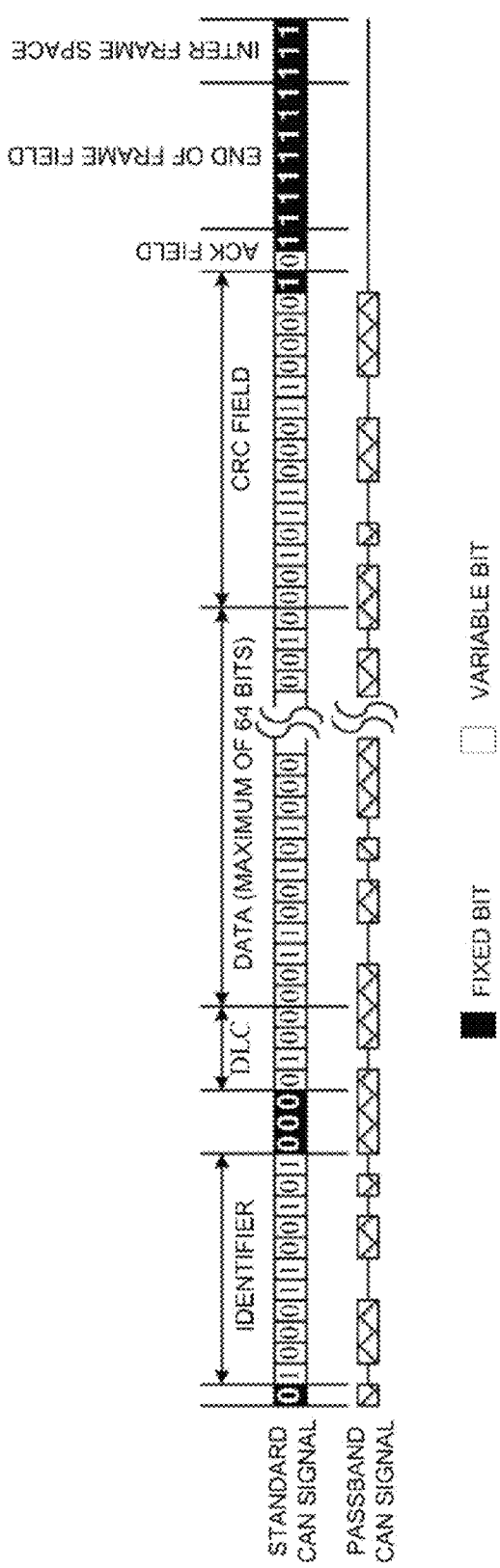
FIG. 17 illustrates a passband CAN signal transmission bit frame according to a standard CAN signal bit when using a standard frame.
Figure 18:
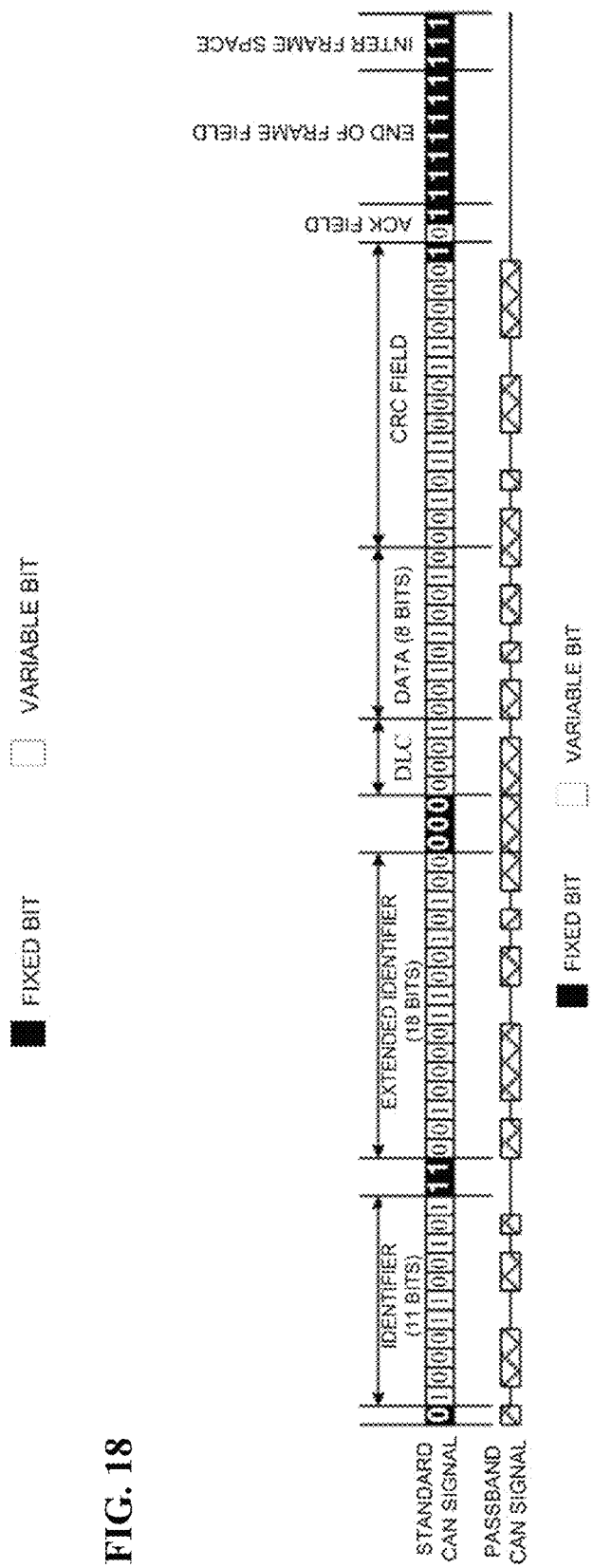
FIG. 18 illustrates a passband CAN signal transmission bit frame according to a standard CAN signal bit when using an extended frame.

FIG. 17 illustrates an example of a standard CAN signal bit stream and corresponding passband CAN signal transmission for a standard CAN frame. The length of data field is set to 32 bits. FIG. 18 illustrates an example of using an extended frame with data field length set to 8 bits, where the transmission of passband CAN signal is turned on and off according to the standard CAN signal bit stream.

Figure 19:
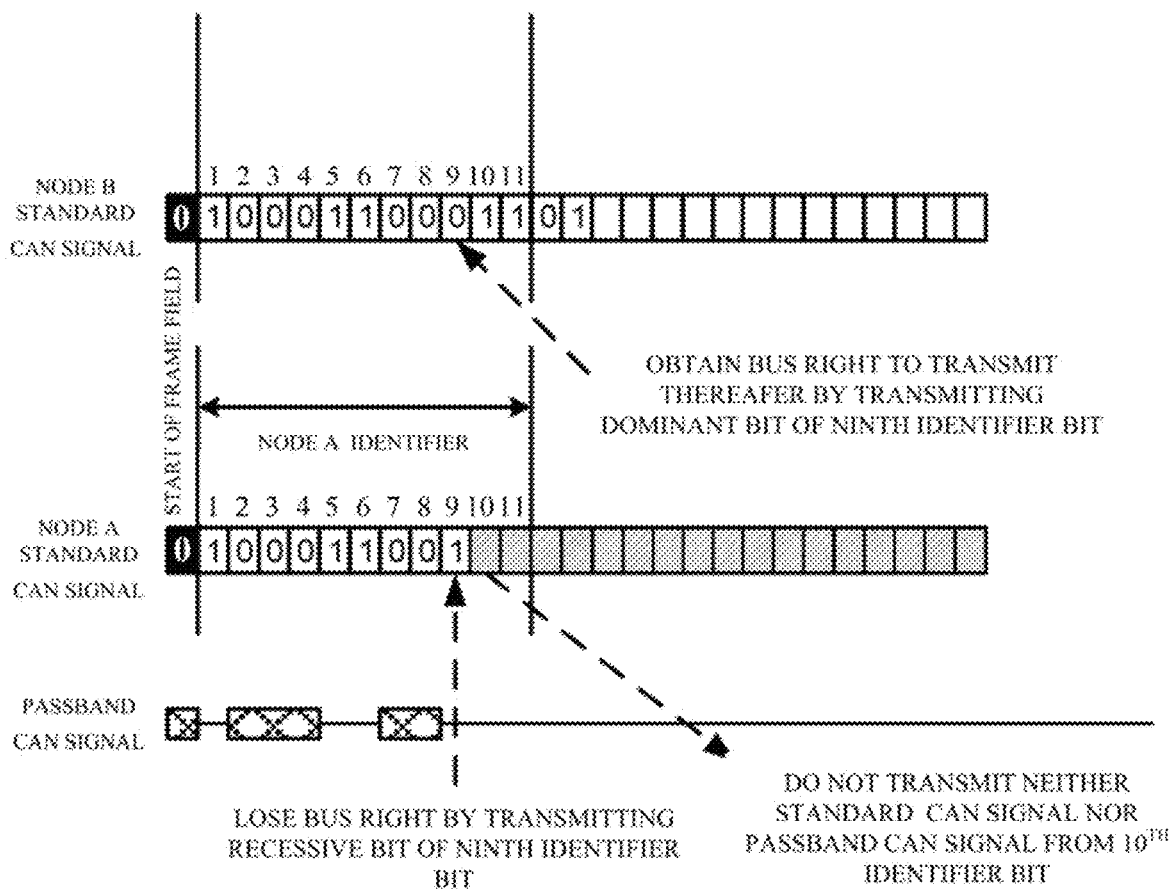
FIG. 19 is a diagram for describing a method of transmitting a passband signal when a node fails to acquire right to use bus due to lower priority during an arbitration process.

FIG. 19 shows the case when two CAN nodes start transmission at the same time. A high-speed CAN node A transmitted 8 bits of identifier bits and is about to transmit ninth bit of a recessive bit as illustrated in FIG. 19, when another node B (the node B may be an standard CAN node or may be the high-speed CAN node according to the present invention) drives the bus to the dominant state. In this case, the node A loses right to drive the bus, and accordingly the high-speed CAN transmitter 200 of the node A should stop the transmission both of the standard CAN signal and the passband CAN signal from the next bit interval.

Figure 20:
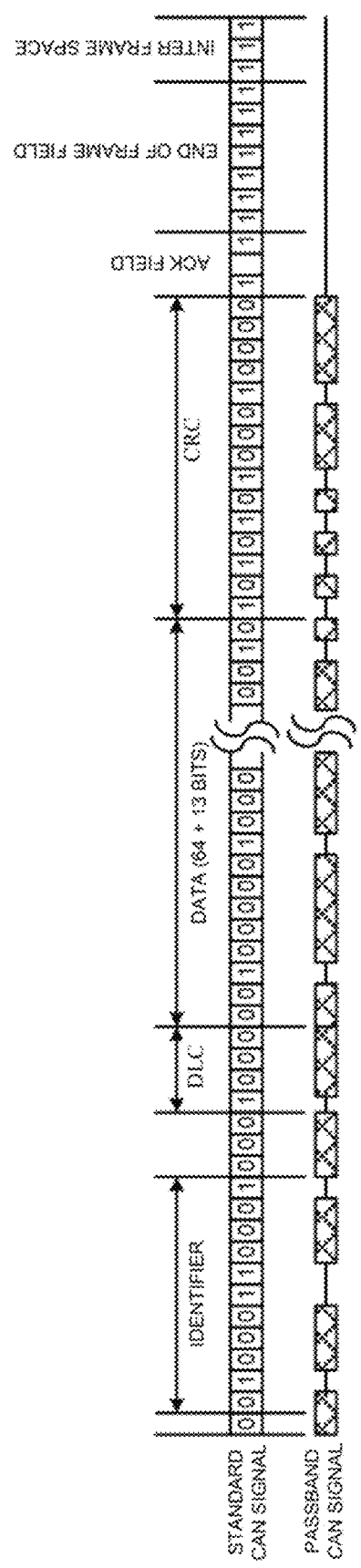
FIG. 20 illustrates a bit frame in which passband CAN signal is transmitted during data field of 64 bits.

In order to maximize the passband CAN transmission interval in the standard CAN frame, all the bit fields in the standard CAN bit stream can be assigned to be dominant bits. Since the arbitration field of the variable fields is a unique identifier in the node, it is not allowed to change the field arbitrarily. Other than the arbitration field, it is possible to change the data field so that the number of dominant bits is maximized. To this end, the DLC bit is fixed to "1000," setting the length of the data transmission interval to 64 bits which is the longest interval in the standard CAN frame. The resulting bit transmission of the CAN bus has repeated pattern of 5 dominant bits and 1 recessive bit during the data field. FIG. 20 illustrates an example in which the passband CAN signal interval is maximized using the repeated pattern of the 5 dominant bits and the 1 recessive bit when 64-bit data is transmitted using the standard CAN frame. The DLC field is set to a bit 1, a bit 0, a bit 0, and a bit 0, and all bits of the 64-bit data field are set to 0 to have a maximum number of dominant bits. According to the CAN standard, since a bit 1 is inserted automatically after the consecutive 5 bits of 0's, the actually transmitted bit stream becomes "100000" starting from the DLC field. It may be seen that the 13-bit recessive bit is inserted in the data bit interval. According to the CAN standard, since the CRC bit is changed according to the data configuration of the entire frame, the dominant bit may not be assigned arbitrarily. The maximum number of dominant bits is 67 bits (3 bits+64 bits) which is the sum of the DLC field and the data field. This means that passband CAN signal can be transmitted at least for the 67-bit interval regardless of the identifier values.

Since the CAN standard operates on the bus to which the plurality of nodes are connected, the high-speed CAN signal of the present invention is also received in the existing standard CAN receivers. Since no high-speed CAN signal is delivered in the recessive bit interval, there is no compatibility issues during recessive bit reception period. During the interval in which the dominant bit is received, the received signal level is limited such that it is higher or equal to a predetermined level in the proposed invention, erroneous detection of the dominant bit as the recessive bit does not occur. In the CAN standard, when a frame which is not compatible with the CAN standard is received on the bus, any node on the bus may interrupt the transmission by transmitting an error frame. On the other hand, when the high-speed CAN receiver observes the high-speed CAN signal on the bus, it recognizes high-speed CAN signal in the passband and performs reception of the high-speed CAN data.

Figure 21:
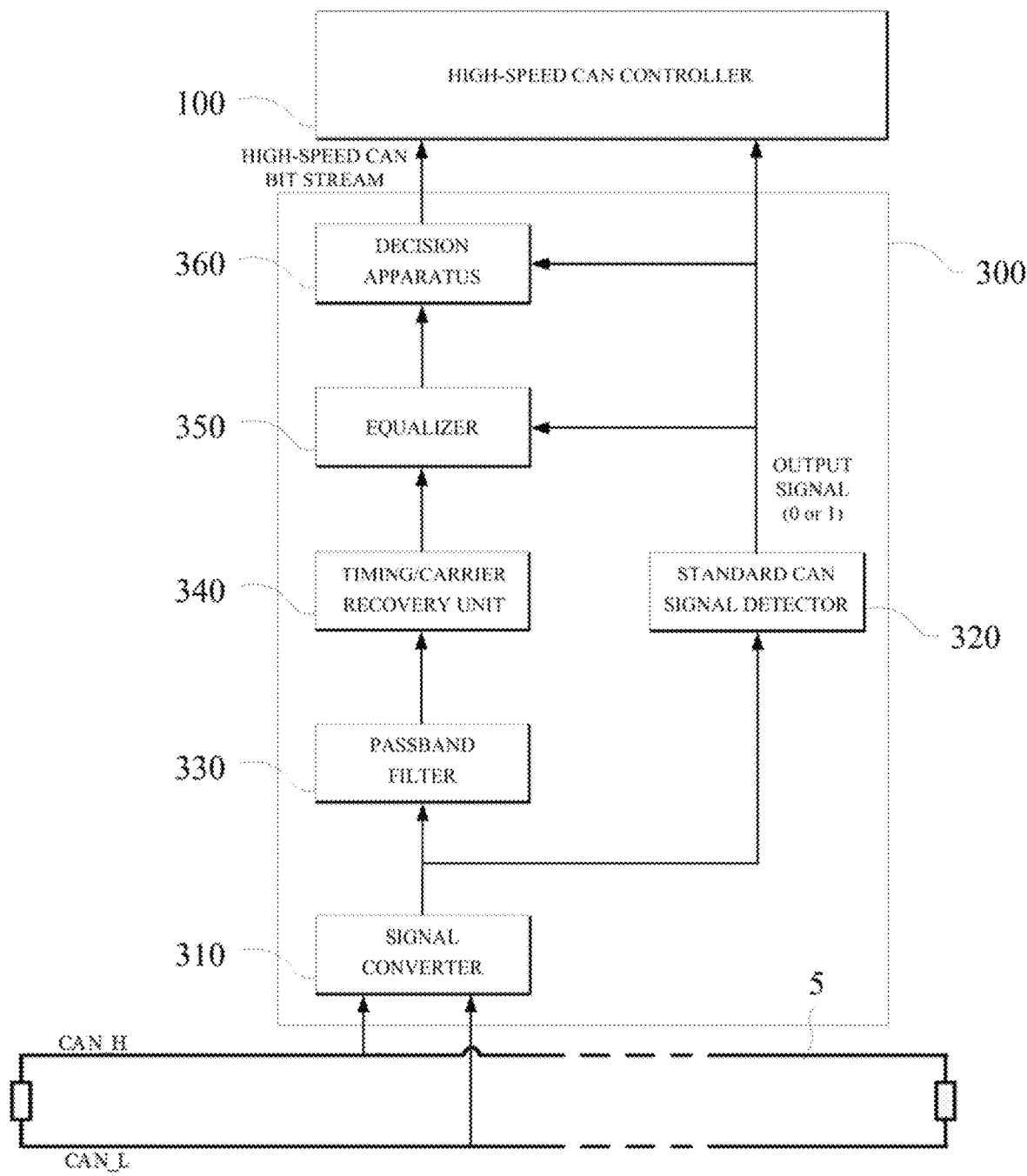
FIG. 21 is an example of a receiver of a high-speed CAN communication system.

FIG. 21 is an example illustrating a configuration of a high-speed CAN receiver 300 of the high-speed CAN communication system, which receives a signal delivered from the bus.

A signal converter 310 performs differential signal-to-single-ended signal conversion on the signal transmitted from the bus 5.

An output of the signal converter 310 is applied to a standard CAN signal detector 320. The standard CAN signal detector 320 detects a dominant bit when the single-ended signal is increased by more than a predetermined level and outputs a signal which is a logic level 1. On the other hand, when the input single-ended signal is decreased by more than a predetermined value, the output signal is converted to a logic level 0. The standard CAN signal detector 320 maintains a current output value when the input single-ended signal is not changed beyond a certain threshold value.

The output from the standard CAN signal detector 320 is delivered to an equalizer 350 and a decision apparatus 360, which will be described below. The standard CAN signal detector determines whether the standard CAN signal delivered from the bus is a dominant bit or a recessive bit.

A passband filter 330 removes the standard CAN signal and noise from the high-speed CAN signal output from the signal converter 310. The output signal from the passband filter 330 is input to a timing/carrier recovery unit 340.

The timing/carrier recovery unit 340 includes a timing recovery unit (not illustrated) and a carrier recovery unit (not illustrated).

The carrier recovery unit recovers the carrier wave using the high-speed CAN signal output from the signal converter 310. The carrier recovery unit corrects a phase and frequency of the high-speed CAN signal in the passband using the recovered carrier wave, and converts the high-speed CAN signal in the passband to a baseband signal.

The timing recovery unit recovers a sampling clock from the high-speed CAN signal, samples down-converted high-speed CAN signal according to the recovered sampling clock and delivers output to an equalizer 350.

The equalizer 350 performs compensation of the channel distortion, and a decision apparatus 360 outputs the high-speed CAN bit stream by performing decision of symbols for each corresponding modulation method. The equalizer 350 and the decision apparatus 360 operate only in an interval in which an output signal value of the standard CAN signal detector 320 is a logic level 1, and stop the operations in an interval in which the output signal value thereof is a logic level 0.

The high-speed CAN bit stream which is an output of the decision apparatus 360 is delivered to the high-speed CAN controller 100, and the high-speed CAN controller 100 takes only an input bit stream in the interval in which the output value of the standard CAN signal detector 320 is a logic level 1, and ignores the output in the interval in which the output value of the standard CAN signal detector 320 is a logic level 0. The high-speed CAN controller 100 may perform frame disassemble, de-interleaving, error correction decoding and the like based on a protocol predefined with the transmitter.

The passband filter 330, the timing/carrier recovery unit 340, the equalizer 350, and the decision apparatus 360 correspond to components which extract the high-speed CAN transmission bit stream from the signal received from the CAN bus 5 according to whether the standard CAN signal is in the dominant bit region or in the recessive bit region.

While the present invention has been described above with reference to the embodiments, it may be understood by those skilled in the art that various modifications and alterations may be may be made without departing from the spirit and scope of the present invention described in the appended claims.

DESCRIPTION OF REFERENCE NUMERALS OF DRAWINGS

5: CAN bus
100: high-speed CAN controller
200: high-speed CAN transmitter
210: passband CAN signal generator
211: serial-to-parallel converter
212: I-signal mapper
213: Q-signal mapper
214: first pulse shaping filter
215: second pulse shaping filter
216: high-speed CAN signal modulator
217: carrier wave generator
220: signal synthesizer
221: multiplier
222: first signal selector
223: second signal selector
224: adder
230: signal converter
300: high-speed CAN receiver
310: signal converter
320: standard CAN signal detector
330: passband filter
340: timing/carrier recovery unit
350: equalizer
360: decision apparatus

The invention claimed is:

1. A high-speed controller area network (CAN) communication system, which is compatible with a CAN communication system, using passband modulation, the system comprising:
a high-speed CAN controller configured to provide a standard CAN transmission bit stream and a high-speed CAN transmission bit stream; and
a high-speed CAN transmitter configured to add a first signal which is generated by modulating the high-speed CAN transmission bit stream in a passband and a second signal based on the standard CAN transmission bit stream to generate a combined signal, and configured to transmit the combined signal to a CAN bus,
wherein the high-speed CAN transmitter outputs the combined signal when a bit input from the standard CAN transmission bit stream is a dominant bit, and outputs the second signal when the input bit is a recessive bit.

2. The system of claim 1, wherein the high-speed CAN transmitter includes:
a passband CAN signal generator configured to perform signal mapping on and modulate the high-speed CAN transmission bit stream and generate the first signal when the dominant bit of the standard CAN transmission bit stream is transmitted; and
a signal synthesizer configured to add the first signal multiplied by a weight to the second signal.

3. The system of claim 2, wherein the passband CAN signal generator includes:
a serial-to-parallel converter configured to convert the high-speed CAN transmission bit stream into multiple streams;
an I-signal mapper configured to map a stream of the multiple streams to an !-signal and generate the I-signal;
a Q-signal mapper configured to map another stream of the multiple streams to a Q-signal and generate the Q-signal;
a pulse shaping filter configured to filter the I-signal and the Q-signal and output a band-limited CAN signal;
a carrier wave generator configured to generate a carrier wave having a passband frequency; and
a modulator configured to add the I-signal and the Q-signal after each of the filtered I-signal and the filtered Q-signal is multiplied by the carrier wave or a phase delayed signal of the carrier wave and output the first signal.

4. The system of claim 2, wherein the signal synthesizer includes a second signal selector configured to receive the standard CAN transmission bit stream as a control input and output 1 V on the dominant bit of the standard CAN transmission bit stream and 0 V on a recessive bit of the standard CAN transmission bit stream.

5. The system of claim 3, wherein the passband CAN signal generator provides a function in which the output of the pulse shaping filter is clipped to 1 when the output of the pulse shaping filter is greater than 0 and is clipped to 0 when the output of the pulse shaping filter is smaller than 0 and is configured to have only 0 or a positive value for the purpose of simplifying the signal synthesizer and a signal converter.

6. The system of claim 2, wherein the signal synthesizer includes a first signal selector configured to receive the standard CAN transmission bit stream as a control input, output the first signal on the dominant bit of the standard CAN transmission bit stream, and output 0 V on a recessive bit of the standard CAN transmission bit stream.

7. The system of claim 1, wherein the high-speed CAN controller transmits the high-speed CAN transmission bit stream in dominant bit interval of fixed fields including start of frame field and identifier field and variable fields including data length code (DLC) field, data field and cyclic redundancy check (CRC) field in the standard CAN transmission bit stream.

8. The system of claim 7, wherein the high-speed CAN controller assigns all bits in data field of a standard CAN frame to bit 0, generates a standard CAN transmission bit stream as a repeated pattern of 5 consecutive dominant bits and a following 1 recessive bit, and transmits the standard CAN transmission bit stream to the high-speed CAN transmitter.

9. The system of claim 2, wherein the high-speed CAN transmitter limits a minimum value of a sum of the first signal and the second signal to be equal to or greater than a predetermined value in a passband CAN signal transmission interval, adjusts the minimum value by a weight of the first signal, and ensures compatibility with existing CAN nodes.

10. The system of claim 2, wherein the passband CAN signal generator finds a maximum value of amplitude generated according to a transmission bit stream by applying a variable amplitude modulation, and limits a maximum amplitude of the first signal based on the found maximum value to ensure compatibility with a conventional CAN transmission apparatus.

11. The system of claim 2, wherein the signal synthesizer applies a variable weight to a field of a CAN frame in the first signal according to a type of the field.

12. The system of claim 1, wherein the high-speed CAN transmitter sets a guard interval to a start portion or an end portion of the first signal in a consecutive dominant bit transmission interval of a standard CAN frame.

13. The system of claim 1, further comprising a high-speed CAN receiver configured to extract the high-speed CAN transmission bit stream from a received signal when the CAN transmission bit stream is in dominant bit interval while receiving a high-speed CAN signal from a CAN bus.

14. A CAN communication system including a CAN transmitter and a CAN bus, the system comprising:
  the CAN transmitter configured to receive a first bit stream and a second bit stream, generate the first bit stream as a standard CAN signal, modulate the second bit stream to generate a passband CAN signal, and transmit a combined signal obtained by adding the passband CAN signal to the standard CAN signal;
  the CAN bus configured to deliver the combined signal; and
  a CAN receiver configured to receive the combined signal,
  wherein the first bit stream is comprised of dominant bits and recessive bits according to the CAN standard, and
  wherein the CAN transmitter outputs the combined signal when a bit input from the first bit stream is a dominant bit, and outputs the standard CAN signal when the input bit is a recessive bit.

15. The system of claim 14, wherein the CAN transmitter modulates the second bit stream when the input bit is the dominant bit, and generates a passband CAN signal.

16. The system of claim 14, wherein the first bit stream is composed of the dominant bits and the recessive bits that comply with the CAN standard, and the second bit stream represents data to be transmitted at a high speed from a CAN node connected to the CAN bus.

17. The system of claim 14, wherein the CAN transmitter limits a minimum value of a sum of the passband CAN signal and the standard CAN signal to be equal to or greater than a predetermined reference value based on a single-ended signal in a passband CAN signal transmission interval.

18. The system of claim 14, wherein the CAN transmitter finds a maximum value of amplitude generated according to a transmission bit stream by applying a variable amplitude modulation, and controls a maximum amplitude of the passband CAN signal to be equal to or smaller than the maximum value based on a single-ended signal.

19. The system of claim 14, wherein the CAN receiver extracts the second bit stream from the received combined signal when the first bit stream included in the standard CAN signal is the dominant bit.

* * * * *